United States Patent [19]

Walda

[11] 3,754,671

[45] Aug. 28, 1973

[54] APPARATUS FOR TRANSFERRING AND SORTING ARTICLES

[76] Inventor: Feede Walda, Leendert Sparreboomstraat 15, Rotterdam, Netherlands

[22] Filed: Sept. 3, 1971

[21] Appl. No.: 177,657

Related U.S. Application Data

[63] Continuation-in-part of Ser. No. 843,123, July 18, 1969, abandoned.

[30] Foreign Application Priority Data

July 22, 1968  Great Britain .................... 34,946/68

[52] U.S. Cl. ................ 214/301, 214/8.5 K, 214/41, 214/46, 214/307
[51] Int. Cl. ............................................ B65b 35/00
[58] Field of Search ................ 214/301, 309, 6 DK, 214/6 H, 8.5 R, 8.5 K, 16.4 A; 198/101

[56] References Cited
UNITED STATES PATENTS

| | | | |
|---|---|---|---|
| 3,379,321 | 4/1968 | Weir | 214/16.4 A |
| 3,200,969 | 8/1965 | Madden | 214/8.5 R |
| 3,512,336 | 5/1970 | Rosecrans | 214/6 DK |
| 3,077,271 | 2/1963 | Siempelkamp | 214/16.6 |
| 3,344,902 | 10/1967 | Crawford | 198/96 |
| 3,637,095 | 1/1972 | Kampfer | 214/41 |
| 3,370,720 | 2/1968 | Schickle | 198/80 |
| 2,937,788 | 5/1960 | Darsie | 214/1 B |
| 3,616,944 | 11/1971 | Field | 198/81 |

Primary Examiner—Gerald M. Forlenza
Assistant Examiner—Lawrence J. Oresky
Attorney—Marshall & Yeasting

[57] ABSTRACT

Apparatus for unloading articles from containers each of which has been loaded with like articles, sorting the articles, and loading each of a plurality of containers with assorted articles comprises mechanism for discharging articles upon a common conveyer from a plurality of successive groups of containers, each group of containers being loaded with like articles. A plurality of branch conveyers lead from the common conveyer, and each of them is provided with a gate that is operable to divert a selected article onto the branch conveyer from the common conveyer. A loading station is located at the end of each branch conveyer for holding a container in a position to receive articles from the branch conveyer.

2 Claims, 5 Drawing Figures

Patented Aug. 28, 1973

INVENTOR.
FEDDE WALDA
BY
Marshall & Yeasting
Attorneys

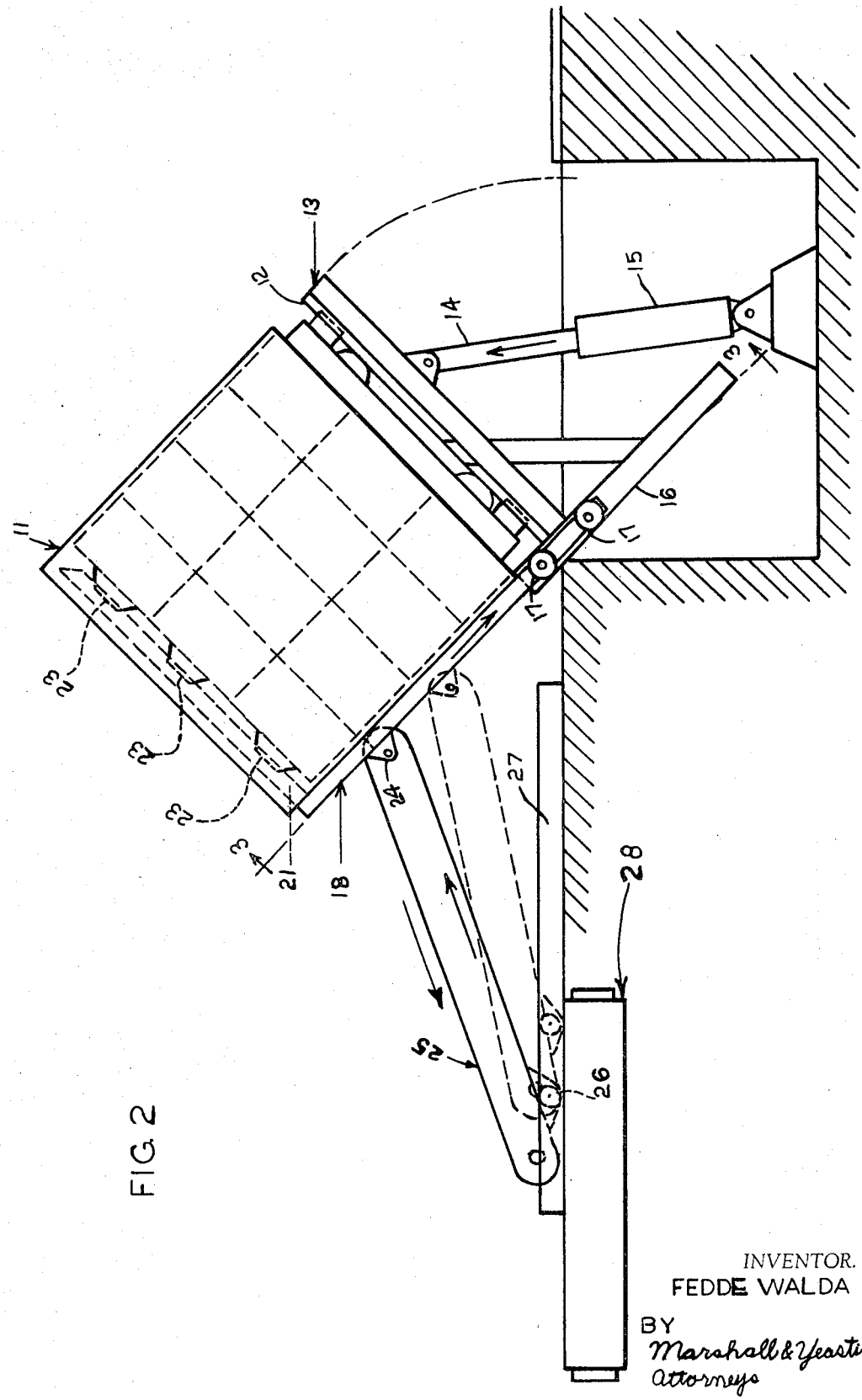

Patented Aug. 28, 1973
3,754,671
3 Sheets-Sheet 3
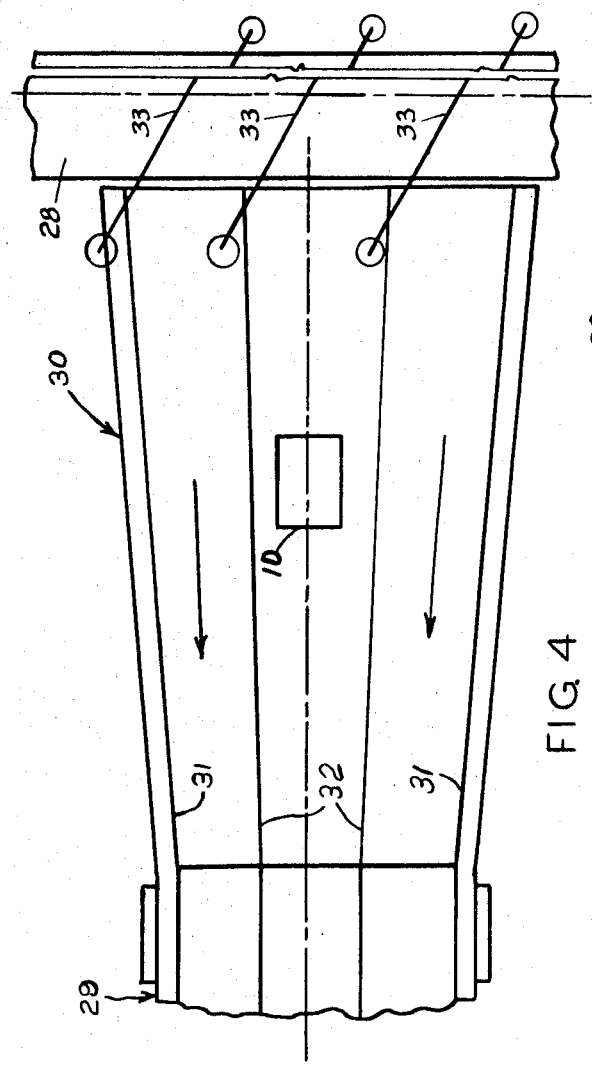
FIG 4
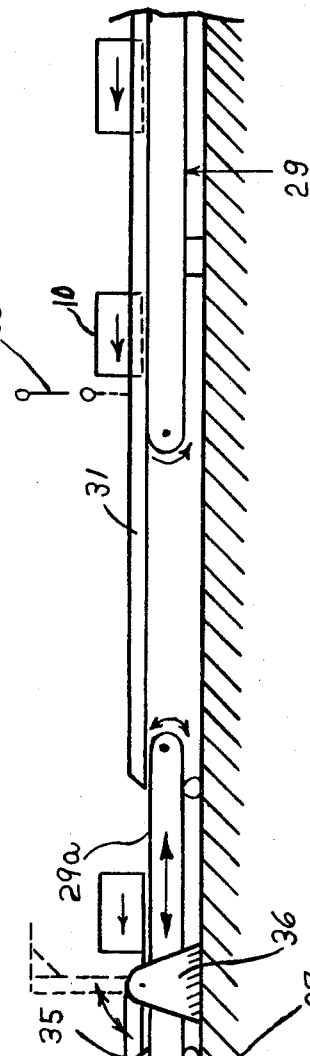
FIG 5
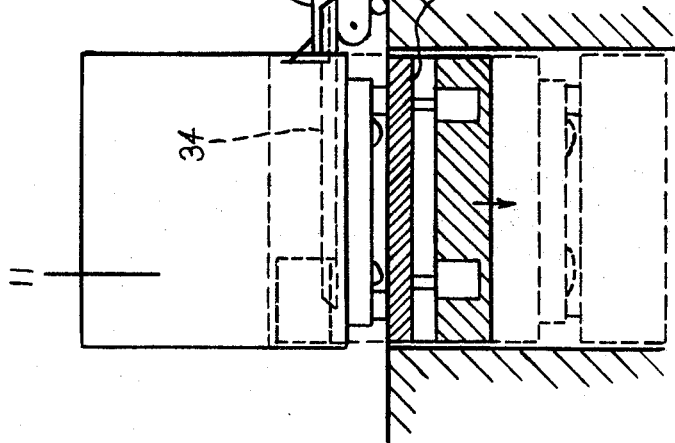
INVENTOR.
FEDDE WALDA
BY
Marshall & Yeasting
Attorneys

APPARATUS FOR TRANSFERRING AND SORTING ARTICLES

CROSS-REFERENCE TO RELATED APPLICATION

This application is a continuation-in-part of application Ser. No. 843,123, filed July 18, 1969, now abandoned.

BACKGROUND OF THE INVENTION

The invention relates to apparatus for transferring articles from one set of containers to another set of containers, while sorting the articles, for example in a warehouse.

The present apparatus is particularly advantageous for use in a warehouse which receives containers of articles from producers and loads containers with articles for shipment to retailers. Each of the containers which is received at such a warehouse from a producer contains like articles, whereas each container that is shipped from the warehouse to a retailer must be loaded with an assortment of articles which has been ordered by the retailer.

SUMMARY OF THE INVENTION

The present apparatus is used for unloading articles from containers each of which has been loaded with like articles, sorting the articles, and loading each of a plurality of containers with assorted articles. In the operation of the present apparatus, articles are discharged upon a common coveyer from a plurality of successive groups of containers, each group of containers being loaded with like articles. A plurality of branch conveyers lead from the common conveyer, and each of them is provided with a gate that is operable to divert a selected article onto the branch conveyer from the common conveyer. A container is held in a position to receive articles from each branch conveyer at a loading station at the end of the branch conveyer.

BRIEF DESCRIPTION OF THE DRAWINGS

FIG. 2 is a diagrammatic elevation of mechanism for discharging articles from a container.

FIG. 4 is a fragmentary plan view of the conveyers.

FIG. 5 is a diagrammatic elevation of a branch conveyer and a loading station.

DESCRIPTION OF THE PREFERRED EMBODIMENT

Figure 1:
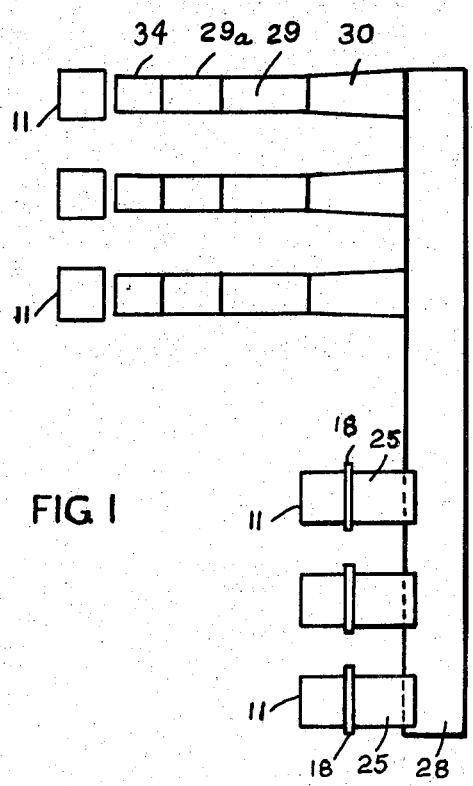
FIG. 1 is a diagrammatic plan view of an apparatus embodying the invention.

Each of the articles which are handled by the apparatus shown in the drawings consists of a plastic box whose dimensions are 40 × 40 × 25 cm. Each of these boxes will hold 32 cans having a capacity of one liter.

Each of the containers 11 holds 36 boxes, arranged in four layers with nine boxes in each layer. Each container preferably is provided with two sets of wheels, each consisting of four wheels, the axes of one set of wheels being at right angles to the axes of the other set of wheels.

Each of the containers 11 is open at the front, so that the container may be loaded or unloaded at the front. A removable cover may be provided for the front of each container, but the containers 11 shown in the drawings are without their covers.

Each container 11 is guided on rails 12 (shown in FIG. 3 and also shown in FIG. 2), and a container to be unloaded is brought onto an unloading platform 13. After a container 11 is brought onto an unloading platform 13 it is clamped to the platform by conventional hold down devices (not shown), and the platform 13 is tilted to the position shown in FIG. 2 by means of a ram 14 operated by a hydraulic or pneumatic cylinder 15.

Secured to the front of the unloading platform 13 are two channels 16 which are arranged with their flanges extending toward one another. Arranged to slide up and down in the channels 16 on rollers 17 is a barrier member 18. This barrier member consists of two side pieces 19 to which are secured a barrier plate 20 extending parallel to the side pieces 19 and a gripper plate 21 extending perpendicular to the side pieces 19.

The gripper plate 21 is a rectangular plate, and is small enough so that when a container 11 is brought onto the unloading platform 13, the gripper plate 21 fits in a space between the top of the container 11 and the upper layer of articles 10. At its front end the gripper plate 21 is provided with lateral extensions 22 which are secured to the side pieces 19 of the barrier member 18.

The gripper plate 21 is provided with nine recesses on its lower side into each of which may be pressed a frusto-conical shaped block of foam rubber. When the gripper plate 21 enters the space between the top of the container 11 and the upper layer of articles 10, it may be located either in the raised position shown in FIG. 3, or in a lowered position in which the foam rubber blocks 23 are compressed. The purpose of the foam rubber blocks 23 is to hold in place a selected number of the articles 10, so that when the container 11 is tilted to the position shown in FIG. 2, with the gripper plate 21 in its lowered position pressing the foam rubber blocks 23 against the boxes in the top layer, only part of the articles 10 in the top layer will slide out of the container.

For example, the three foam rubber blocks in the front row may be removed from the gripper plate 21 so that there are only six foam rubber blocks, located in the two back rows of recesses. Then when the container 11 is tilted as shown in FIG. 2, the six compressed foam rubber blocks will hold six of the articles in the top layer firmly in place, while the three articles in front of the top layer are not held by foam rubber blocks and thus will slide out of the tilted container 11.

It will be understood that instead of employing a selected number of foam rubber blocks to hold a selected number of articles 10 in the top layer when the container 11 is tilted, the gripper plate 21 may be provided with nine power-operated gripping devices which can be selectively operated to hold a selected number of articles in the top layer when the container is tilted to the position shown in FIG. 2.

Secured to the front of the barrier member 18 are a pair of brackets 24 which support one end of a belt conveyer assembly 25. The other end of the belt conveyer assembly 25 is supported upon rollers 26 which travel in tracks 27.

Figure 3:
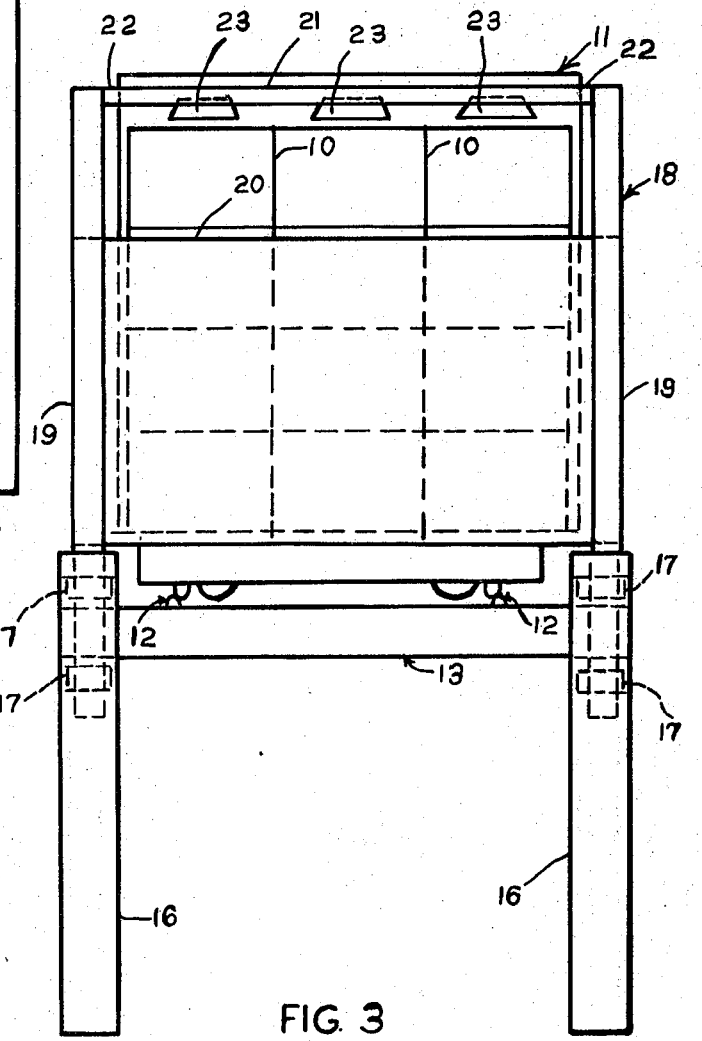
FIG. 3 is a view taken along the line 3—3 of FIG. 2.

When the barrier member 18 is in the position shown in FIG. 3 and the container 11 is tilted to the position shown in FIG. 2, any articles in the top layer which are not held by foam rubber blocks 23 will slide out of the container 11 onto the belt conveyer assembly 25. If all of the foam rubber blocks 23 are omitted from the gripper plate 21, or if the gripper plate 21 is in the raised position shown in FIG. 3, all nine of the articles in the top layer will slide onto the belt conveyer assembly. The belt conveyer assembly 25 may then be moved to the position shown in dashed lines in FIG. 2. At the same time, the barrier member 18, which is guided by the rollers 17, is moved downward far enough in the channels 16 so that the barrier plate 20 covers only the two lowermost layers of articles, thus permitting a second layer of the articles to slide out of the container 11 onto the belt conveyor assembly 25.

Thereafter, the barrier member 18 is moved downward in two more successive steps, so as to permit two more successive layers of articles to slide out of the container 11 onto the belt conveyer assembly 25.

FIG. 1 shows three belt conveyer assemblies 25, for discharging three containers 11. All of the boxes in the three containers 11 which are discharged in one operation hold identical commodities. Since each container 11 holds 36 boxes, the apparatus shown in FIG. 1 is capable of delivering as many as 108 identical boxes in a single discharging operation. If only 72 or a lesser number of boxes are required, only two of the containers 11 will be discharged in one operation.

It is only necessary that one of the barrier members 18 be provided with a gripper plate 21, and the other two barrier members at the other two unloading stations need not have a gripper plate 21.

During each discharging operation, only part of the boxes held by one of the containers 11 may be discharged, but all of the boxes in the other container or containers 11 will be discharged upon the belt conveyor assemblies 25.

For example, if more than 72 boxes of a particular commodity are required, then two of the containers 11 will be completely discharged, and the third container 11 will be completely or partially discharged, depending upon whether the total number of boxes required is 108, or is a lesser number between 72 and 108.

When only part of the boxes are discharged from one of the containers 11, all nine of the boxes in the upper layer are first discharged, unless the number of boxes required from that particular container is less than 9. Each of the layers of boxes in the container is discharged, beginning with the upper layer. If the number of boxes required from the container is not a multiple of nine, then part of the boxes in the last layer to be discharged are held back by the foam rubber blocks 23.

For example, if 21 boxes are to be discharged from a container, the 18 boxes in the two upper layers are first discharged, without any interference from the gripper plate 21, and the gripper plate 21 is then pressed firmly upon the next layer of boxes. Then if the three front foam rubber blocks have been omitted from the gripper plate 21, the three front boxes will be discharged as soon as the barrier plate 20 is brought into a position low enough to expose those boxes and to permit them to slide onto the conveyer assembly 25.

As shown in FIG. 1, the three belt conveyer assemblies 25 discharge upon a common conveyer 28. The belt conveyer assemblies 25 should be operated at a speed substantially slower than the speed of travel of the common conveyer 28, so that when the three barrier members 18 are lowered in synchronism, the belt conveyer assemblies 25 will simultaneously deliver the first three boxes from each of the containers 11, and all of those boxes will be carried away by the common conveyer 28 before the second set of three boxes from each of the containers 11 arrives upon the belt conveyer 28.

The common belt conveyer 28 preferably is provided with a conventional spacing device, to space the boxes 10 uniformly at intervals of about 0.8 meters.

A plurality of branch conveyers 29 lead from the common conveyer 28. For the sake of simplicity, only three branch conveyers 29 are shown in FIG. 1, but the number of branch conveyers 29 preferably is substantially greater than the number of belt conveyer assemblies 23 discharging onto the common conveyer 28.

The boxes 11 travel from the common conveyer 28 to each of the branch conveyers 29 by way of a converging chute 30, which is provided with side plates 31 for guiding the boxes 11, and also is provided with divider plates 32 which divide the chute 30 into three separate channels.

Each of the chutes 30 is provided with three gates 33, which may be lowered momentarily in order to divert a box 11 from the common conveyer 28 into the chute 30. If three boxes 11 are to be diverted into the chute 30, the three gates 33 are lowered momentarily in front of three of the boxes, causing the three boxes to be deflected into the chute. Then if less than three boxes are required to complete a particular order, only one or two of the gates 33 are lowered, to supply the last box or the last two boxes of a particular commodity to a chute. Thereafter, the gates 33 remain in their elevated positions while the remainder of the boxes holding that particular commodity travel onward to the succeeding branch conveyer or conveyers 29.

At the end of each branch conveyer 29 is a loading station for holding a container 11 in a position to receive articles from the branch conveyer.

In each discharging operation, all of the containers 11 which are being discharged onto the belt conveyer assemblies 25 are filled with identical articles, so that during each discharging operation, the branch conveyers 29 are delivering identical articles to the containers at their loading stations. After each group of containers has been discharged, the empty containers, one of which may be only partially emptied, are removed from the unloading platforms 13. Then a new group of containers, all holding identical articles, are brought onto the unloading platforms 13 and are simultaneously discharged as hereinbefore described.

In this way, the desired number of each type of article is supplied to each of the containers in the loading stations at the ends of the branch conveyers 29.

In delivering successive groups of articles into a chute 30, the gates 33 are operated either simultaneously or in a fixed sequence, so that the branch conveyer 29 always is provided with successive rows each consisting of three boxes or three articles.

In that way, each container 11 on a loading station at the end of a branch conveyer 29 can be loaded with successive layers, each layer consisting of nine boxes, until the container 11 has been filled or has received the desired number of boxes.

The main part of each branch conveyer 29 may consist of a continuously-running belt. Each branch conveyer also includes an auxiliary conveyer belt assembly 29a which does not run continuously but can be run forward or backward or held stationary. Each auxiliary conveyer belt assembly 29a also can be moved bodily forward or backward for a distance of 1.3 meters.

The side plates 31 and the dividing plates 32 extend beyond the chutes 30 and extend throughout the length of each branch conveyer 29. The side plates 31 and divider plates 32 also extend for some distance beyond the end of each branch conveyer 29, as shown in FIG. 5.

Each auxiliary conveyer belt assembly 29a carries a forward-extending platform 34.

At the beginning of each loading operation, the auxiliary belt conveyer assemblies 29a with their platforms 34 are in the positions shown in FIG. 1, adjacent to the branch conveyers 29. Under those conditions, the overhanging side plates 31 and divider plates 32 extend from each branch conveyer 29 over its auxiliary belt conveyer assembly 29a, in substantially abutting relationship with similar side plates and divider plates which are provided on each platform 34.

A barrier 35 is pivotable through an angle of 90°, as shown in FIG. 5, and is carried by the two supports 36 located at the two sides of each auxiliary conveyer belt assembly 29a.

At the start of a loading operation, with the parts in the positions shown in FIG. 1, the auxiliary conveyer belts 29a are driven forward until nine packages 10 have been pushed onto the platform 34 and against the pivoted barrier 35. The auxiliary belt conveyer 29a is then stopped, and the auxiliary conveyer belt assembly 29a and its platform 34 are moved backward through a distance of 10 to 15 cm. This moves the nine boxes back from the pivoted barrier 35. The barrier 35 is then tilted upright to the position shown in dashed lines in FIG. 5, and the auxiliary conveyer belt assembly 29a with its platform 34 are moved forward to the position shown in FIG. 5. The auxiliary conveyer belt is then driven forward, in order to push the nine boxes tightly against the rear wall of the container 11. The auxiliary conveyer belt is then driven backward for a distance of 10 to 15 cm. while the platform remains in the position shown in FIG. 5. This moves back any boxes which are standing upon the auxiliary conveyer belt 29a, so as to produce a gap between those boxes and the boxes which have been pushed into the container 11. The barrier 35 is then pivoted to the horizontal position shown in FIG. 5. The lower edge of the face plate of the barrier 35 is notched to fit over the side plates and divider plates on the platform 34.

With the parts in the positions shown in FIG. 5, the auxiliary conveyer belt assembly 29a with its platform 34 is moved bodily backward to its starting position adjacent to the branch conveyer 29. During this movement, the barrier 35 holds the nine boxes which have just been inserted into the container 11, and the platform 34 is pulled completely out of the container 11. The barrier 35 is then raised momentarily to its vertical position while an elevator 37 which supports the container 11 is lowered through a distance equal to the height of the layer of boxes which has been delivered into the container 11. The whole operation is then repeated in order to deliver a second layer of nine boxes into the container 11.

Each branch conveyer 29 is provided with an end gate 38 which is lowered whenever the auxiliary conveyer belt assembly 29a is moved away from the branch conveyer 29, in order to prevent any boxes from running off the end of the branch conveyer 29.

The loading of each container 11 supported by one of the elevators 37 is continued until the desired number of boxed, up to a maximum of 36 boxes, has been introduced into the container. FIG. 5 shows in dashed lines the position which will be occupied by the container 11 and the elevator 37 while the uppermost layer of boxes is being loaded into the container. I claim:

1. Apparatus for unloading articles from containers each of which has been loaded with like articles, sorting the articles, and loading each of a plurality of containers with assorted articles, comprising mechanism for discharging articles upon a common conveyor from a plurality of successive groups of containers, said mechanism comprising apparatus for tilting each container, a barrier which is movable downward in steps to permit the articles to be discharged one layer at a time from a tilted container, and a plurality of grippers for selectively holding part of the articles in a layer while permitting the remainder to be discharged, each group of containers being loaded with like articles, a plurality of branch conveyors leading from the common conveyor, each of which is provided with a gate that is operable to divert a selected article onto the branch conveyor from the common conveyor, and a loading station at the end of each branch conveyor for holding a container in a position to receive articles from the branch conveyor.

2. Apparatus for unloading articles from containers each of which has been loaded with like articles, sorting the articles, and loading each of a plurality of containers with assorted articles, comprising mechanism for discharging articles upon a common conveyor from a plurality of successive groups of containers, each group of containers being loaded with like articles, a plurality of branch conveyors leading from the common conveyor, each of which is provided with a gate that is operable to divert a selected article onto the branch conveyor from the common conveyor, a loading station at the end of each branch conveyor for holding a container in a position to receive articles from the branch conveyor, each branch conveyor being provided with a loading platform which is horizontally movable between a retracted position in which it is substantially continuous with the branch conveyor and an extended position in which it is inserted into a container on the loading station at the end of the branch conveyor, and a barrier being provided which is movable between an inoperative position and an operative position, behind the extended position of the loading platform, for holding the articles in the container while the loading platform is being retracted.

* * * * *